(12) United States Patent
Thompson et al.

(10) Patent No.: US 10,999,407 B1
(45) Date of Patent: May 4, 2021

(54) SERVICE GROUP INTERACTION MANAGEMENT

(71) Applicant: Amazon Technologies, Inc., Seattle, WA (US)

(72) Inventors: Jonathan Paul Thompson, Seattle, WA (US); Ryan Paul Green, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/518,915

(22) Filed: Jul. 22, 2019

Related U.S. Application Data

(62) Division of application No. 15/084,431, filed on Mar. 29, 2016, now Pat. No. 10,362,141.

(51) Int. Cl.
  *H04L 29/08* (2006.01)
  *H04L 12/707* (2013.01)
  *G06F 9/54* (2006.01)

(52) U.S. Cl.
  CPC ............ *H04L 67/327* (2013.01); *G06F 9/542* (2013.01); *H04L 45/22* (2013.01); *H04L 67/2804* (2013.01)

(58) Field of Classification Search
  CPC ... H04L 67/327; H04L 67/2804; H04L 45/22; G06F 9/542
  See application file for complete search history.

(56) References Cited

U.S. PATENT DOCUMENTS

| 7,814,226 | B2 * | 10/2010 | Patrick | H04L 41/145 |
| | | | | 709/238 |
| 8,719,919 | B2 * | 5/2014 | Rice | H04L 67/16 |
| | | | | 726/15 |
| 9,369,307 | B2 * | 6/2016 | Rice | H04L 67/16 |
| 9,503,228 | B2 * | 11/2016 | Subhedar | H04L 41/142 |
| 10,182,129 | B1 * | 1/2019 | Peterson | H04L 41/5009 |
| 10,362,141 | B1 * | 7/2019 | Thompson | H04L 45/22 |
| 2008/0215752 | A1 * | 9/2008 | Che | H04L 61/1541 |
| | | | | 709/238 |
| 2013/0174146 | A1 * | 7/2013 | Dasgupta | G06F 9/5077 |
| | | | | 718/1 |
| 2014/0032768 | A1 * | 1/2014 | Ding | H04L 67/303 |
| | | | | 709/226 |
| 2014/0237108 | A1 * | 8/2014 | Kurabayashi | G06F 9/505 |
| | | | | 709/224 |

(Continued)

FOREIGN PATENT DOCUMENTS

EP         3035619 A1 * 6/2016     ........... H04L 12/931

*Primary Examiner* — Michael C Lai
(74) *Attorney, Agent, or Firm* — Nicholson De Vos Webster & Elliott LLP

(57) ABSTRACT

A technology is described for monitoring interaction events at services and determining service management actions associated with the services. An example method may include receiving metadata describing interaction events at services executing in a computing service environment and using the metadata to generate a routing map that provides routing details for the interaction events at the services. The routing map may be analyzed to identify interaction characteristics associated with the interaction events at the services and the analysis of the routing map may be used in determining a service management action associated with the services based in part on the interaction characteristics associated with the interaction events.

20 Claims, 8 Drawing Sheets

(56) References Cited

U.S. PATENT DOCUMENTS

2017/0134287 A1\* 5/2017 Shaw .................... H04L 47/125
2017/0323472 A1\* 11/2017 Barnes ................. G06K 9/3208
2017/0366433 A1\* 12/2017 Raleigh ............... H04L 43/0888

\* cited by examiner

FIG. 2

SERVICE GROUP INTERACTION MANAGEMENT

PRIORITY DATA

This application is a divisional of U.S. patent application Ser. No. 15/084,431 and U.S. Pat. No. 10,362,141, which is incorporated herein by reference.

BACKGROUND

The advent of virtualization technologies for computing resources has provided benefits with respect to managing large-scale computing resources used to execute services that are accessible to applications and other services executing on various platforms. For example, virtualization technologies may allow a single physical computing machine to host multiple services executing on computing instances and/or software containers using a hypervisor. For example, each computing instance may be a guest machine acting as a distinct logical computing system that executes an application or service executing on a computing instance with the perception that the service is the sole occupier of a given virtualized hardware computing resource.

Application Programming Interfaces (APIs) are defined interfaces that allow applications to communicate with services and access enterprise assets, as well as allow services to communicate with other services. An API may be defined as a set of resources and methods. Developers can create an API to enable access data, business logic, or functionality from services executing within a computing service environment. An API gateway may be a service that allows devices and applications to connect to hosted services that provide business logic.

BRIEF DESCRIPTION OF THE DRAWINGS

FIG. 2 is a block diagram that illustrates various example components included in a system for monitoring interaction events and determining service management actions based in part on the interaction events.

DETAILED DESCRIPTION

Figure 1:
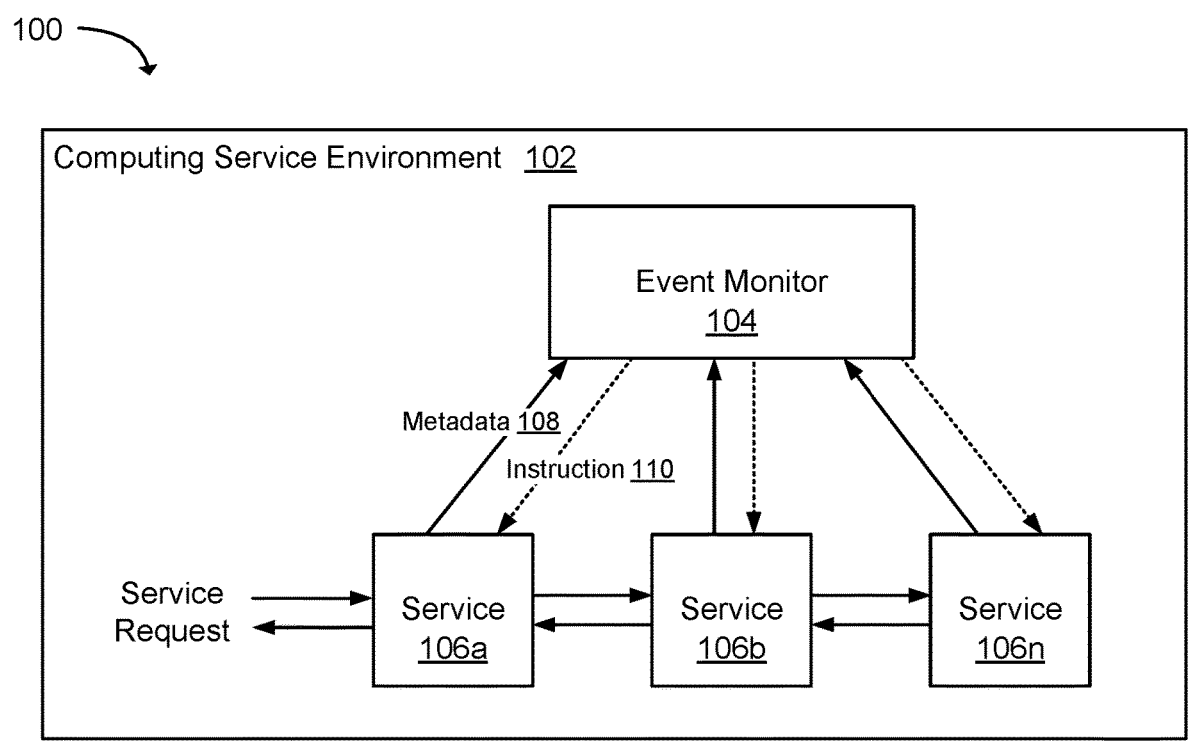
FIG. 1 is a block diagram illustrating an example system for monitoring interaction events associated with services within a computing service environment and determining service management actions based in part on the interaction events.

A technology is described for analyzing interaction events that occur between services executing within a computing service environment and determining service management actions based in part on the interaction events. The computing service environment may include computing instances hosted on servers that execute the services. Alternatively, the services may be hosted within an API gateway. The services may provide customer business functions, as well as end point services that may include data store services, security services, network services, and the like. The services may be utilized by devices, applications and other services. For example, network addressable devices included in a network of addressable devices (e.g., the Internet of Things (JOT)) may utilize the services. The devices may be configured to communicate with the services using APIs (Application Program Interfaces), and the services in return may communicate with one another via the network using the APIs.

In one example, interaction events may include API request events, HTTP (Hypertext Transfer Protocol) request events, remote procedure call events, packet communication events, etc. The interaction events may occur at services operating within a computing service environment. The interaction events may be observed by collecting metadata that describes the interactions events. An interaction event may include sending or receiving a service request at a service. For example, after a service request is received at a service, metadata describing the service request may be generated and the metadata may be provided to an event monitor. A service may be configured to generate metadata for interaction events, or the service may call another computing service that executes a function that generates the metadata. The event monitor may collect the metadata and generate an interaction map detailing interactions at the services. For example, an interaction map may provide information about how service requests are routed from an entry point to a service in the computing service environment, and routed from the service to an exit point in the computing service environment.

The event monitor may be configured to analyze the interaction map and identify interaction characteristics (e.g., routing patterns, routing paths, request frequencies, request sources, request destinations, routing times, etc.) associated with interactions that occur between the services included in the computing service environment. Based in part on the interaction characteristics identified, the event monitor may be configured to determine a service management action associated with the services. An example of a service management action may include specifying alternate routing paths and shifting service request loads among the services, as well as other actions.

In the past, information related to interaction events occurring at services included in a computing service environment has been incomplete and therefore, has not provided a comprehensive view of the interactions occurring between the services. As a result of the current technology, metadata describing interaction events at services included in a computing service environment may be analyzed to obtain a comprehensive view of the interactions occurring between the services and service management actions may be determined based in part on the interactions between the services.

FIG. 1 is a block diagram illustrating a high level example of a system 100 for monitoring interaction events at services 106a-n executing within a computing service environment 102 and determining service management actions based in part on the interaction events. Interaction events may include API requests, HTTP requests, remote procedure calls, packet communications, and the like. As illustrated, the computing service environment 102 hosts a number of services 106a-n and an event monitor 104. The services 106a-n may be federated services or micro-services. A federated service may be an autonomous service interconnected via a computer network to other autonomous services by way of one or more network gateways. A micro-service may be a narrowly focused independently deployable service configured to execute a single task in response to a service request (e.g., an API request). While FIG. 1 depicts three services 106a-n, it will be appreciated that any number of services 106a-n may be included in the computing service environment 102.

In one example, the services 106a-n may provide business functions and/or end services to applications and devices via APIs configured for the services 106a-n. An API for a service 106a-n may be a defined interface that allows applications, devices, and other services 106a-n to communicate with the service 106a-n and access computing resources or assets included in the computing service environment 102 that are available by way of the service 106a-n. The API may be defined as a set of resources and methods that are available to the applications, devices, and other services 106a-n via the service 106a-n. As an illustration, a network addressable device (e.g., an IOT device) may utilize an API to send sensor data to a service 106a-n included in the computing service environment 102 for processing, or an application may utilize an API to request data processing from a service 106a-n.

The services 106a-n may be configured to interact with each other via API requests. As an illustration, as part of fulfilling an API request, service 106a may be configured to make an API request to service 106b, which in turn may make an API request to service 106n. As a more specific example, service 106a may be configured to process Internet orders for items, service 106b may be configured to verify item inventories, and service 106n may be an item inventory data store (e.g., an endpoint service). In receiving an item order, service 106a makes an API request to service 106b to determine whether the item is in stock. Service 106b then makes an API request to service 106n querying the item inventory data store for a current item inventory. Service 106n then returns the current item inventory to service 106b, who then notifies service 106a that the item is either in-stock or out-of-stock.

Figure 3:
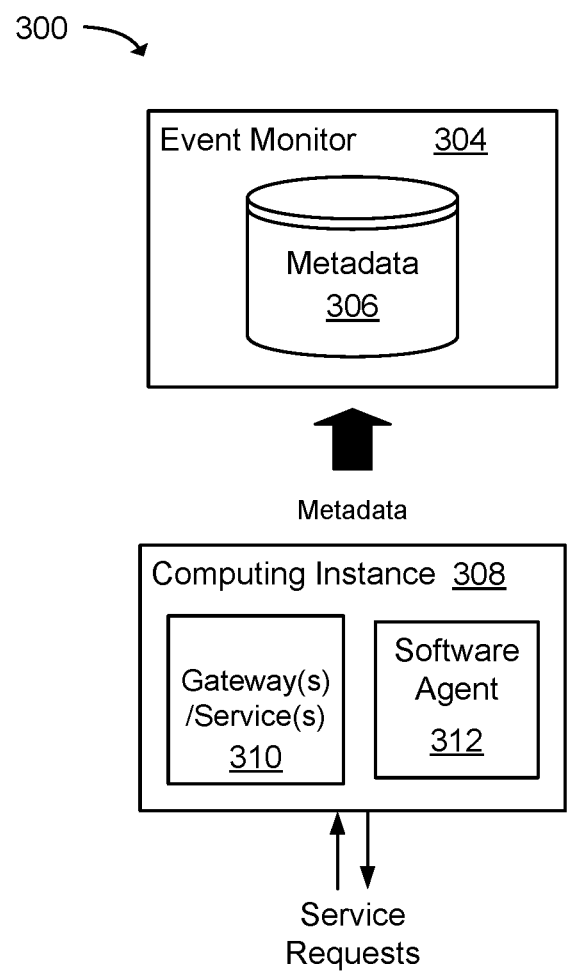
FIG. 3 is a block diagram illustrating an example system for generating metadata using an agent in association with interaction events at a service.
Figure 4:
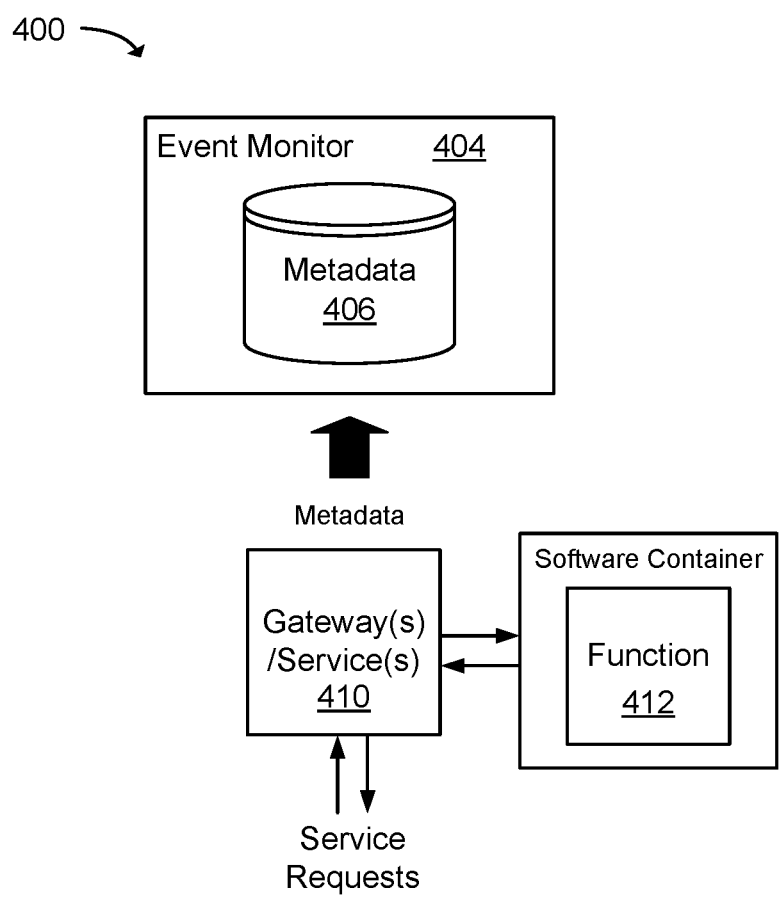
FIG. 4 is a flow diagram illustrating an example method for generating metadata using a function in association with interaction events received at a service or sent from a service.

As described in greater detail in association with FIGS. 3 and 4, metadata 108 describing API events at the services 106a-n may be generated and the metadata 108 may be provided to the event monitor 104, which may be configured to collect the metadata 108 and generate a routing map using the metadata 108. The routing map may provide details about API events occurring at the services 106a-n. The event monitor 104 may be configured to analyze the routing map and identify routing characteristics associated with routing API requests made and received by the services 106a-n. Examples of routing characteristics may include, but are not limited to: API request sources, API request destinations, routing paths used to transmit API requests to and from the services 106a-b within the computing service environment 102, routing times, frequency at which API requests are made to the services 106a-n, API request loads of the individual services 106a-n, as well as other information that may be obtained from the metadata 108.

Figure 2:
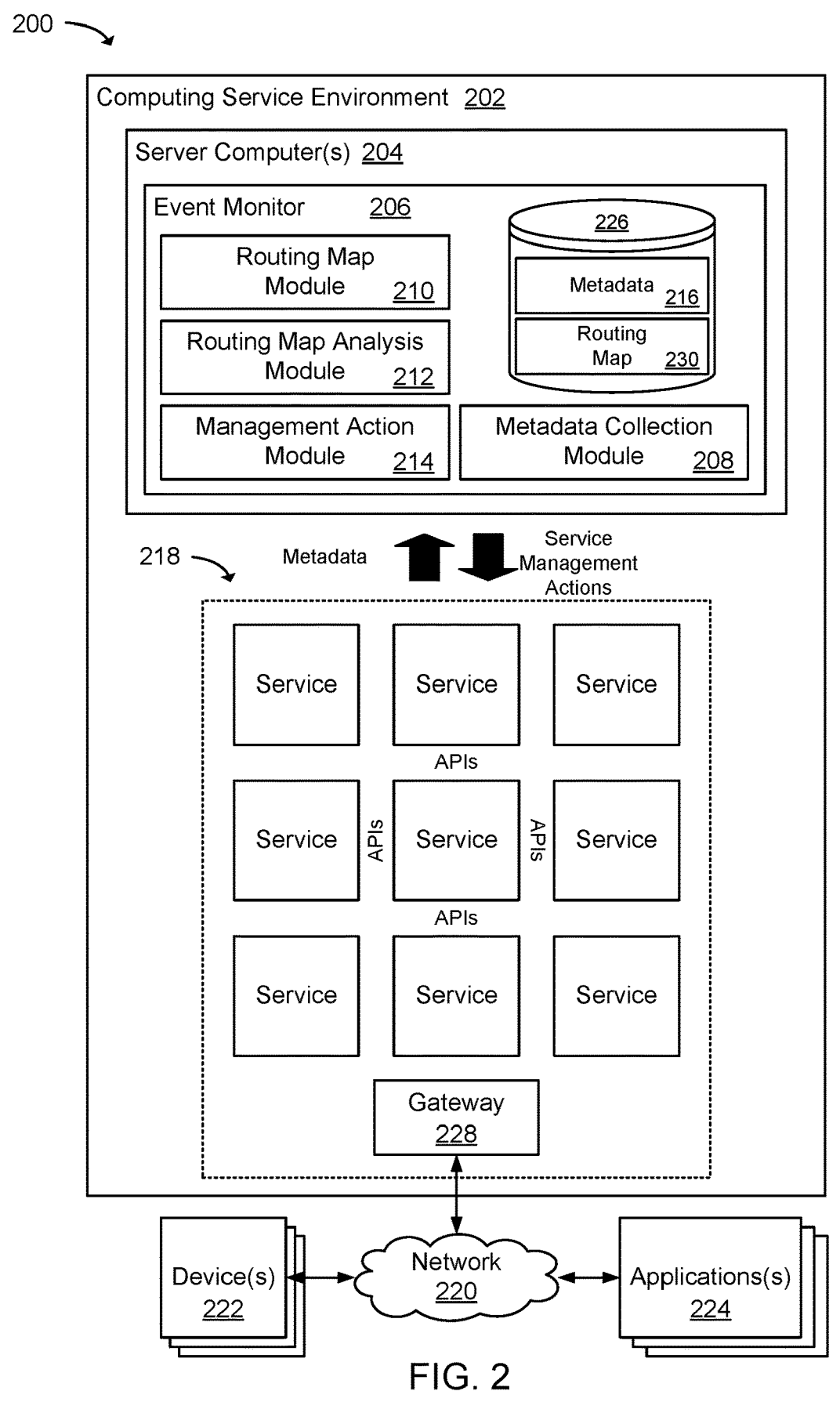

The routing characteristics may be analyzed and the results of the analysis may be used in determining API request management actions as described in greater detail in FIG. 2. The event monitor 104 may be configured to make recommendations for API request management actions to the services 106a-n, as well as provide recommendations to other services and applications used to manage the performance of service related components (e.g., network devices) included in the computing service environment 102. One example of an API request management action may include specifying alternate routing paths for API requests that result in faster routing times and minimize latency, reduce network congestion, or result in shifting API request loads among the services 106a-n. For example, the event monitor 104 may be configured to send instructions 110 to the services 106a-n instructing the services 106a-n to perform an API request management action. As a specific example, a first service 106a may receive an instruction 110 to route API requests made by the first service 106a to a second service 106b, as opposed to making API requests to the Nth service 106n. Other examples of API request management actions may include making recommendations based on API request observations or predictions, assigning weights to instances of a service 106a-n that are used to distribute API requests to the instances, reporting suspected malicious activity based on routing patterns, as well as other API request management actions that can be determined by observing API request activity.

FIG. 2 illustrates components of an example system 200 on which the present technology may be executed. The system 200 may include a computing service environment 202 having one or more server computers 204 that host an event monitor 206 and services 218 providing business functions and/or end services to applications 224 and devices 222 via API requests routed to the services 218. The computing service environment 202 may include computing resources for executing computing instances (e.g., virtual machines), which may be an instance of a software implementation of a machine (i.e. a computer) that executes applications like a physical machine. The event monitor 206 and the services 218 may be executed using computing instances. In one example, a computing instance may host a service 218. In another example, a computing instance may host a software container (e.g., a Docker container) that executes a service 218 (i.e., a micro-service) within the software container.

The services 218 may be in communication with the applications 224 and/or the devices 222 via APIs. In addition, the services 106a-n may communicate with each other via the APIs. API requests made to the services 218 may be transmitted over a physical network 220 and a virtualized network. The physical network connects devices 222 and applications to physical servers that host one or more computing instances. The virtualized network connects services 218 hosted by computing instances executing on the physical servers to the physical network 220. As illustrated, API requests made between the services 218 and the devices 222/applications 224 may be routed through a gateway 228 (e.g., an API gateway). In some examples, each service 218 may be associated with an individual gateway 228 specific to the service 218.

The event monitor 206 may include modules used to collect and analyze metadata 216 (e.g., API request metadata), and determine API request management actions based in part on the analysis of the metadata 216. For example, the event monitor 206 may include a metadata collection module 208, a routing map module 210, a routing map analysis module 212, and a management action module 214. The metadata collection module 208 may be configured to receive metadata 216 from the services 218 and store the metadata 216 in a data store 226 and/or in computer memory. The metadata 216 may describe API requests received at a gateway 228 for the services 218 and/or API requests received at the services 218 themselves.

Metadata may be generated in response to receiving a service request at a gateway 228 or at a service 218. As one example, in receiving an API request at a gateway 228 or service 218, the API request may be analyzed and metadata 216 may be generated that describes the API request. As an illustration, API request information may be extracted from the hypertext of an API request. For instance, a destination service 218 may be identified via a URL (Uniform Resource Locator) included in the hypertext and API parameters used to describe the API request may be obtained from the API request hypertext. Additional information related to the API request may be obtained from a gateway 228 or service 218, such as the source of the API request, a status of the API request, a return value for the API request, and the like. The API request information may then be used to generate metadata 216 (e.g., metadata tuple). The metadata 216 may include, but is not limited to, an inbound request identifier (e.g., for a request received at a service 218), outbound request identifier (e.g., a request made by a service 218), a composite identifier (e.g., a composite of identifiers for each hop that an API request made between a source and a destination), timing, status, return value, etc. Examples of systems used to generate metadata in response to receiving or sending a service request at a service 218 or gateway 228 are described below in association with FIGS. 3 and 4. Metadata 216 may be sent to the event monitor 206 and the metadata collection module 208 may be configured to store the metadata 216 to a data store 226 that may be accessible to the routing map module 210.

The routing map module 210 may be configured to generate a routing map 230 using the metadata 216 that describes interaction events at the gateway 228 and/or the services 218. Illustratively, a routing map 230 may be a matrix of interconnections (and related communication data) between pairs of services 218 and gateways 228 within the computing service environment 202. A routing map 230 may provide an overview of interactions that occur between the services 218 within the computing service environment 202. In some examples, routing maps 230 may be generated for individual services 218 and/or gateways 228 and may provide an overview of interaction events for an individual service 218 and/or gateway 228.

In one example, the routing map module 210 may be configured to retrieve metadata 216 sent to the event monitor 206 and collected by the metadata collection module 208, and generate a routing map 230 from the metadata 216. The routing map 230 may include details for interactions between the services 218, and between the gateway 228 and the services 218 that are derived from the metadata 216. For example, the routing map 230 may include details for routing paths used to route API requests to the gateway 228 and the services 218. A routing path included in the routing map 230 may expose an API request flow of an API request transmitted through the system 100. As an illustration, a routing path may show that API requests received at a gateway 228 are routed to service A, which in turn makes API requests to service B. A routing map 230 may be periodically updated or regenerated as additional metadata 216 is received from the services 218 and/or the gateway 228.

The routing map analysis module 212 may be configured to analyze the routing map 230 (i.e., the routing map data) and identify routing characteristics associated with routing service requests to services 218 and gateways 228. As one example, API routing characteristics may be identified for a particular service 218, gateway 228, group of services 218, API request source, API request destination, etc. The API routing characteristics may include, but are not limited to: API routing paths, dependent paths, routing patterns, routing times, request queuing, response times, request loads, and other API routing characteristics that can be used to gauge API activity within the computing service environment 202.

In one example, machine learning may be used to identify routing characteristics for a routing map 230. Non-limiting examples of machine learning models that may be used to identify routing characteristics may include decision tree models, support-vector machines, naïve Bayes models, random forest models, and the like. A machine learning model may be constructed using routing map data. The machine learning model may be used to identify service request patterns associated with service requests routed to the gateway 228 and the services 218, and the service request patterns may be analyzed as part of evaluating service request activity within the computing service environment 202.

In one example, service request patterns may be used to predict API request events. For example, a routing map 230 may be analyzed (e.g., using machine learning) to identify API request patterns that may be used to predict API request events at the services 218. Analysis of API request patterns may show a history of when and how much API activity occurs at a service 218, as well as how API activity at the service 218 impacts other services 218 linked directly or indirectly to the service 218. In some cases an API request management action may be performed in anticipation of a predicted API request event. For example, computing resources used by a service 218 to process API requests may be increased or decreased in anticipation of API request, or computing resources used by another service 218 directly or indirectly linked to the service may be increased or decreased.

Routing characteristics identified using a routing map 230 may be analyzed by the routing map analysis module 212 and the results of the analysis can be used to provide an administrator and/or a customer with an overview of service request activity associated with services 218 and gateways 228 included in a computing service environment 202. Also, the results of the analysis can be used in managing various aspects of the computing service environment 202 and making configuration recommendations for services 218 and gateways 228. For example, a service management action may be based in part on routing characteristics identified in a routing map 230.

The following examples illustrate how routing characteristics identified using a routing map 230 may be analyzed and how the results of the analysis may be used to manage aspects of a computing service environment 202 via the management action module 214. The management action module 214 may be configured to monitor routing characteristics and implement a service related management action based in part on rules used to evaluate the routing characteristic.

In one example, analysis of routing characteristics may expose associations and interactions between services 218 that can be used in managing the computing service environment 202. For example, the evaluation of API request characteristics (e.g., API routing paths and patterns) for a service 218 may show the service's reliance on other services 218 to fulfill API requests. As a specific example, API request characteristics may show that service A is reliant on service B to fulfill API requests. In evaluating API routing characteristics for service A, a determination may be made (via a rule) to colocate service A on a server or in a data center that hosts service B due to service A's reliance on service B.

In another example, analysis of routing characteristics may expose topology weaknesses in a service request topology. As one example, analysis of API routing characteristics may show that API requests are being inefficiently routed to the services 218, resulting in increased routing times, or over/under utilization of some services 218. As another example, analysis of API routing characteristics may show that API request loads are being unevenly distributed among the services 218 (e.g., instances of a service 218), resulting in increased API loads on some services 218. Consequently, in identifying a service request topology weakness, further analysis may be performed to identify a management action that mitigates or remedies the service request topology weakness.

In the case that an inefficient routing path is identified, further analysis may be performed of a routing map 230 to identify alternate routing paths and the alternate routing paths may be analyzed to determine whether any of the alternate routing paths may result in a decreased routing time as compared to a routing time for the inefficient routing path. For example, API request routing characteristics associated with a current routing path used to route API requests to a service 218 may be compared to API request routing characteristics for an alternate routing path that may be available to route the API requests to the service 218. Based in part on the comparison, a determination may be made whether the alternate routing path results in more efficient routing of the API request as compared to the current routing path. In the case that the alternate routing path is determined to be more efficient, the alternate routing path may be selected (via the management action module 214) for routing API requests to the service 218.

In the case that service request loads are unevenly distributed among services 218 (or among instances of a service 218), further analysis of a routing map 230 may be performed to determine processing loads of the services 218 based in part on a volume of service requests being routed to the services 218. A processing load of a service 218 may be based on a number of service requests routed to the service 218 over a defined period of time. Based on the analysis, a routing scheme for the service requests that shifts the processing load to other services 218 may be determined and the routing scheme may be implemented via the management action module 214 communicating routing information to the services 218 or gateway 228. As an illustration, analysis of routing patterns associated with API requests made to a service 218 that includes multiple service instances (e.g., instance A, and instance B) that execute on one or more computing instances included in the computing service environment 202 may show that a processing load for one of the service instances (e.g., instance A) may be higher than the processing load of other service instances (e.g., instance B). In response, a routing scheme may be implemented that reduces a number of API requests routed to the service instance with the higher processing load (e.g., instance A) by increasing the API request load on the other service instances (e.g., instance B).

In one example, weightings used to distribute service requests to the services 218 may be determined based in part on analysis of routing characteristics associated with the service requests and the services 218. As an illustration, routing patterns associated with API requests made to a service 218 having multiple service instances may be analyzed and based in part on the analysis, weightings for distributing API requests to the service instances may be determined. For example, the analysis of the routing patterns may indicate that some service instances are being assigned a greater number of API requests as compared to other service instance, or that some service instances have more processing capacity as compared to other service instances. In response to the analysis, weightings may be assigned to the services (via the management action module 214) according to a service's API request load and/or capacity to process API requests.

In another example, analysis of routing characteristics may suggest an impending system failure. For example, analysis of the API routing characteristics may result in identifying abnormal API request routing characteristics (e.g., slow response times, response timeouts, etc.) showing that a particular service 218 may be non-responsive to API requests, or may be slow in responding to API requests, suggesting that the service 218 may be ailing or has failed. In response, a gateway 228 may be instructed (via the management action module 214) to reroute API requests to the service 218 to another service 218.

In another example, analysis of routing characteristics may expose abnormal routing characteristics that suggest abnormal service request activity. For example, abnormal API routing characteristics may show a significant increase in API requests to a service 218 suggesting malicious network activity or a faulty application 224 or device 222 making the API requests. In response to detecting abnormal API routing characteristics that suggest abnormal API activity, a management action may be performed (via the management action module 214) that remedies or mitigates the abnormal API activity. For example, a gateway 228 may be instructed to block API requests received from an identified API request source, or destination service 218 may be scaled to accommodate an increase in API requests.

As indicated earlier, the management action module 214 may be configured to monitor routing characteristics and implement the service request related management actions illustrated above (as well as other service request related management actions not specifically illustrated here, but that are within the scope of this disclosure) based on rules used to evaluate the routing characteristics. In one example, an API request related management action may be implemented by instructing a service 218, a group of services, and/or a gateway 228 to perform the management action. A service 218, group of services, or gateway 228 may receive an instruction to perform a management action directly from the event monitor 206. Alternatively, an instruction to perform a service request related management action may be appended to an service request (e.g., a Hypertext Transfer Protocol (HTTP) message) received at a gateway 228 and forwarded to an intended service 218, where the instruction may be read by the service 218. A service 218 or gateway 228 receiving an instruction to perform a service request related management action may perform the management action specified in the instruction.

Devices 222 in communication with the services 218 included in the computing service environment 202 may include network addressable devices (e.g., IOT devices) such as, but not limited to, network addressable electronic readers, printers, laptops, watches, light switches, lightbulbs, media players, voice command devices, video cameras, doorbell systems, door locks, smoke alarms, thermostats, security systems, farming machinery, industrial printers, as well as any other device that may be configured to communicate over a network 220. Also the devices 222 may include client devices such as, but not limited to, a desktop computer, laptop or notebook computer, tablet computer, mainframe computer system, handheld computer, workstation, network computer, or other devices with like capability. Applications 224 in communication with the services 218 may include enterprise applications and services, mobile applications, desktop applications, and the like.

The various processes and/or other functionality contained within the system 200 may be executed on one or more processors that are in communication with one or more memory modules. The system 200 may include a number of computing devices that are arranged, for example, in one or more server banks or computer banks or other arrangements. The computing devices may support a computing environment using hypervisors, virtual machine monitors (VMMs) and other virtualization software.

The system may include one or more data stores 226. For example, a data store 226 may store metadata 216 and a routing map 230. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API requests, procedure calls or other network commands that may be made in relation to the modules and services included in the computing service environment 202 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The physical network 220 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

FIG. 3 is a block diagram illustrating an example of a system 300 for generating metadata 306 in association with service request activity at a gateway or service 310. As illustrated, a computing instance 308 may host a gateway and/or service(s) 310 and a software agent 312 configured to generate metadata 306 in response to service request activity that occurs at the gateway and/or service(s) 310. Metadata 306 generated by the software agent 312 may be sent to the event monitor 304. For example, an API request may be received at a service/gateway 310 and upon receiving the API request, the software agent 312 may be configured to analyze the API request and generate metadata 306 that describes the API request. For example, the API request may be parsed to identify parameters in the API request and the identified parameters may be extracted and placed in a metadata tuple. The metadata in the metadata tuple may collectively provide a description of the API request that can be used in combination with other metadata tuples to generate an overview of API activity occurring among a group of services. Illustratively, metadata 306 may include, but is not limited to, a request identifier, an outbound request identifier, a composite identifier, timing, a status, and/or a return value. The software agent 312 may send the metadata 306 to the event monitor 304, or alternatively, return the metadata 306 to the gateway or service 310, which sends the metadata 306 to the event monitor 304.

FIG. 4 is a block diagram illustrating an example system 400 for generating metadata 406 using a function 412. Illustrated is a gateway and/or service 410 configured to call a function 412 that generates metadata 406 in response to an interaction event that occurs at an gateway and/or service 410. Illustratively, the function 412 may be executed using a software container. As one example, a gateway or service 410 may call the function 412 in response to API activity at the gateway or service 410 (i.e., send or receive an API request). In calling the function 412, an API request and information related to the API request (e.g., API request source information, timing information, etc.) may be provided to the function 412. The function 412 may be configured to parse the API request and identify components of the API request (e.g., destination service and parameters) and extract the identified components. The components may be used by the function 412 to generate metadata 406 that describes the API request. The function 412 may return the metadata 406 to the gateway or service 410, and the gateway or service 410 may send the metadata 406 to the event monitor 404. Alternatively, the function 412 may be configured to send the metadata 406 directly to the event monitor 404.

Figure 5:
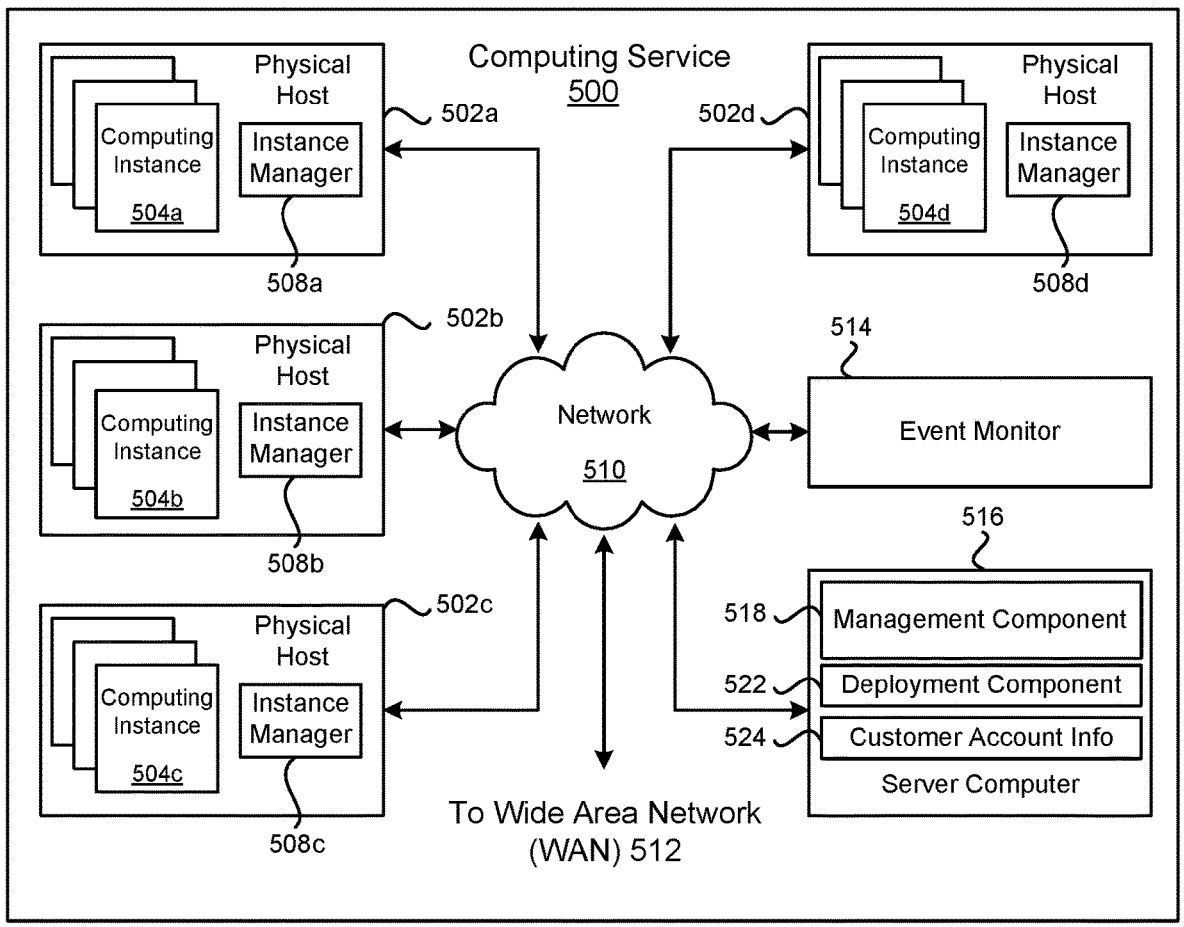
FIG. 5 is a block diagram that illustrates an example computing service environment that includes an event monitor.

Moving now to FIG. 5, a block diagram illustrates an example computing service 500 that may be used to execute and manage a number of computing instances 504a-d. In particular, the computing service 500 depicted illustrates one environment in which the technology described herein may be used. The computing service 500 may be one type of environment that includes various virtualized service resources that may be used, for instance, to host computing instances 504a-d.

The computing service 500 may be capable of delivery of computing, storage and networking capacity as a software service to a community of end recipients. In one example, the computing service 500 may be established for an organization by or on behalf of the organization. That is, the computing service 500 may offer a "private cloud environment." In another example, the computing service 500 may support a multi-tenant environment, wherein a plurality of customers may operate independently (i.e., a public cloud environment). Generally speaking, the computing service 500 may provide the following models: Infrastructure as a Service ("IaaS"), Platform as a Service ("PaaS"), and/or Software as a Service ("SaaS"). Other models may be provided. For the IaaS model, the computing service 500 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 500. End customers may access the computing service 500 using networked client devices, such as desktop computers, laptops, tablets, smartphones, etc. running web browsers or other lightweight client applications, for example. Those familiar with the art will recognize that the computing service 500 may be described as a "cloud" environment.

The particularly illustrated computing service 500 may include a plurality of server computers 502a-d. While four server computers are shown, any number may be used, and large data centers may include thousands of server computers. The computing service 500 may provide computing resources for executing computing instances 504a-d. Computing instances 504a-d may, for example, be virtual machines. A virtual machine may be an instance of a software implementation of a machine (i.e. a computer) that executes applications like a physical machine. In the example of a virtual machine, each of the server computers 502a-d may be configured to execute an instance manager 508a-d capable of executing the instances. The instance manager 508a-d may be a hypervisor, virtual machine monitor (VMM), or another type of program configured to enable the execution of multiple computing instances 504a-d on a single server. Additionally, each of the computing instances 504a-d may be configured to execute one or more applications.

One or more server computers 514 and 516 may be reserved to execute software components for managing the operation of the computing service 500 and the computing instances 504a-d. For example, a server computer 514 may execute an event monitor configured to collect metadata for service requests made to gateways and services executing on the computing instances 504a-d hosted by the physical hosts 502a-d. The event monitor may be configured to analyze interaction events associated with the gateways and services and make recommendations for automated management actions related to the interaction events.

A server computer 516 may execute a management component 518. A customer may access the management component 518 to configure various aspects of the operation of the computing instances 504a-d purchased by a customer. For example, the customer may setup computing instances 504a-d and make changes to the configuration of the computing instances 504a-d.

A deployment component 522 may be used to assist customers in the deployment of computing instances 504a-d. The deployment component 522 may have access to account information associated with the computing instances 504a-d, such as the name of an owner of the account, credit card information, country of the owner, etc. The deployment component 522 may receive a configuration from a customer that includes data describing how computing instances 504a-d may be configured. For example, the configuration may include an operating system, provide one or more applications to be installed in computing instances 504a-d, provide scripts and/or other types of code to be executed for configuring computing instances 504a-d, provide cache logic specifying how an application cache should be prepared, and other types of information. The deployment component 522 may utilize the customer-provided configuration and cache logic to configure, prime, and launch computing instances 504a-d. The configuration, cache logic, and other information may be specified by a customer accessing the management component 518 or by providing this information directly to the deployment component 522.

Customer account information 524 may include any desired information associated with a customer of the multi-tenant environment. For example, the customer account information may include a unique identifier for a customer, a customer address, billing information, licensing information, customization parameters for launching instances, scheduling information, etc. As described above, the customer account information 524 may also include security information used in encryption of asynchronous responses to API requests. By "asynchronous" it is meant that the API response may be made at any time after the initial request and with a different network connection.

A network 510 may be utilized to interconnect the computing service 500 and the server computers 502a-d, 516. The network 510 may be a local area network (LAN) and may be connected to a Wide Area Network (WAN) 512 or the Internet, so that end customers may access the computing service 500. The network topology illustrated in FIG. 5 has been simplified, many more networks and networking devices may be utilized to interconnect the various computing systems disclosed herein.

Figure 6:
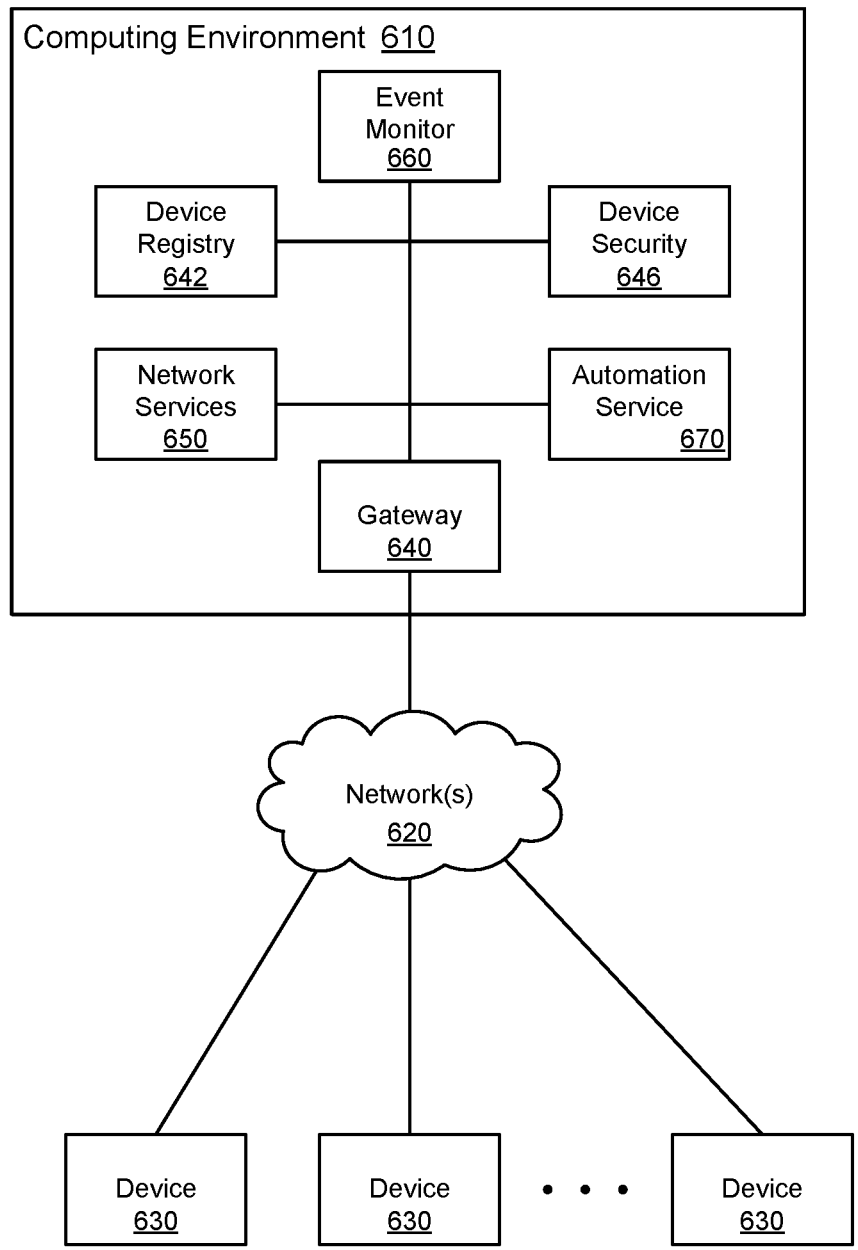
FIG. 6 is a block diagram illustrating an example computer networking architecture for providing network addressable devices access to network services via APIs.

FIG. 6 is a diagram illustrating an example computing service environment 610 with which network addressable devices 630 (e.g., IOT devices) may communicate. The computing service environment 610 includes various services that are made accessible via gateway server 640 to the devices 630 that access the gateway server 640 via a network 620. The devices 630 may access the computing service environment 610 in order to access the services such as data storage and computing processing features. The services operating in the computing service environment 610 may communicate data and messages to the devices 630 in response to API requests from devices and/or in response to computing operations within the services. API request loads for the services may be monitored as described earlier and indirectly associated services may be scaled based in part on changes in the API request loads.

The computing service environment 610 comprises communicatively coupled component systems 640, 642, 646, 650 and 670 that operate to provide services to the devices 630. The gateway server 640 may be programmed to provide an interface between the devices 630 and the computing service environment 610. The gateway server 640 receives API requests from the devices 630 and forwards corresponding data and messages to the appropriate systems within the computing service environment 610. Likewise, when systems within the computing service environment 610 attempt to communicate data instructions to the devices 630, the gateway server 640 routes those API requests to the correct device 630.

The gateway server 640 may be adapted to communicate with varied devices 630 using various different computing and communication capabilities. For example, the gateway server 640 may be adapted to communicate using either TCP (Transmission Control Protocol) or UDP (User Datagram Protocol) protocols. Likewise, the gateway server 640 may be programmed to receive and communicate with the devices 630 using any suitable protocol including, for example, MQTT (Message Queue Telemetry Transport), CoAP (Constrained Application Protocol), HTTP (Hyper Text Transport Protocol), and HTTPS (Hyper Text Transport Protocol Secure). The gateway server 640 may be programmed to convert the data and instructions or messages received from the devices 630 into a format that may be used by other of the server systems comprised in the computing service environment 610. In one example, the gateway server 640 may be adapted to convert a message received using the HTTPS protocol into a JSON (JavaScript Object Notation) formatted message that is suitable for communication to other servers within the computing service environment 610.

In one example, the gateway server 640 may communicate via any suitable networking technology with a device registry server 642 that tracks the attributes and capabilities of each device 630, an automation service server 670 specifying rules or logic (e.g., automation rules) for handling various requests that may be received from the devices 630, a device security server 646 that maintains security-related information for the devices 630 that connect to the computing service environment 610, a network services server 650 used by any of servers 640, 642, 646, or 670 to process requests from the devices 630, and an event monitor server 660 that analyzes API request metadata for API requests made within the computing service environment 610 and instructs services to auto scale based in part on the analysis.

Servers 640, 642, 646, 650, and 670 may be communicatively coupled via any suitable networking hardware and software. For example, the servers may communicate via a local area network or wide area network.

The devices 630 may be any devices that may be communicatively coupled via a network 620 with the computing service environment 610. For example, the devices 630 may be computing devices such as smart phones and tablet computers, automobiles, appliances such as washers and driers, industrial sensors, switches, control systems, etc. In one example, each of devices 630 may communicate over the network 620 via APIs to store data reflecting the operations of the particular device 630 and/or to request processing provided by, for example, network services server 650. While FIG. 6 depicts three devices 630, it will be appreciated that any number of devices 630 may access the computing service environment 610 via the gateway server 640. Further it will be appreciated that the devices 630 may employ various different communication protocols. For example, some devices 630 may transport data using TCP, while others may communicate data using UDP. Some devices 630 may use MQTT, while others may use CoAP, and still others may use HTTPs. It will also be appreciated that each of devices 630 may be programmed to send and receive particular functions or commands in its requests that are not compatible with other devices or even the systems within computing service environment 610. The gateway server 640 may be programmed to receive and, if needed, attend to converting such requests for processing with the computing service environment 610.

Figure 7:
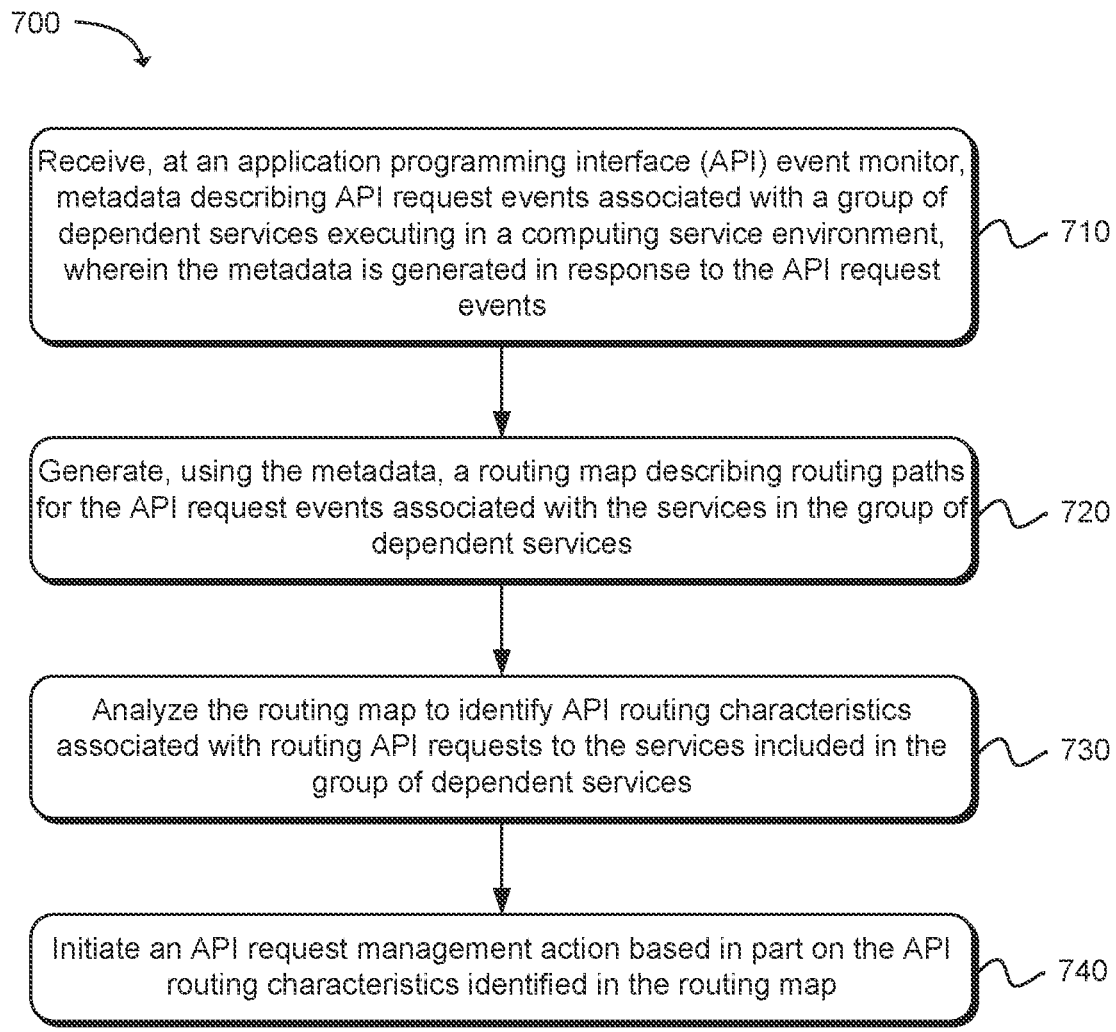
FIG. 7 is a flow diagram that illustrates an example method for determining service management actions for services based in part on interaction events at the services.

FIG. 7 is a flow diagram illustrating an example method 700 for determining service management actions for services based in part by analyzing a routing map generated using metadata describing API request events at the services. Beginning in block 710, metadata may be received that describes API request events associated with a group of dependent services executing in a computing service environment. The metadata may be generated in response to the API request events and the metadata may be received at an API event monitor configured to collect the metadata.

As in block 720, a routing map that describes routing paths for the API events associated with the services in the group of dependent services may be generated using the metadata. The event monitor service may be configured to generate the routing map and, as in block 730, the routing map may be analyzed to identify API routing characteristics associated with routing requests to the services included in the group of dependent services.

As in block 740, an API request management action may be initiated based in part on the API routing characteristics identified in the routing map. For example, the event monitor service may analyze the routing map to identify API routing characteristics that may include, but are not limited to: routing paths, routing patterns, routing times, and other API routing characteristics associated with API request events that occur at the services that may be used in determining service management actions.

Figure 8:
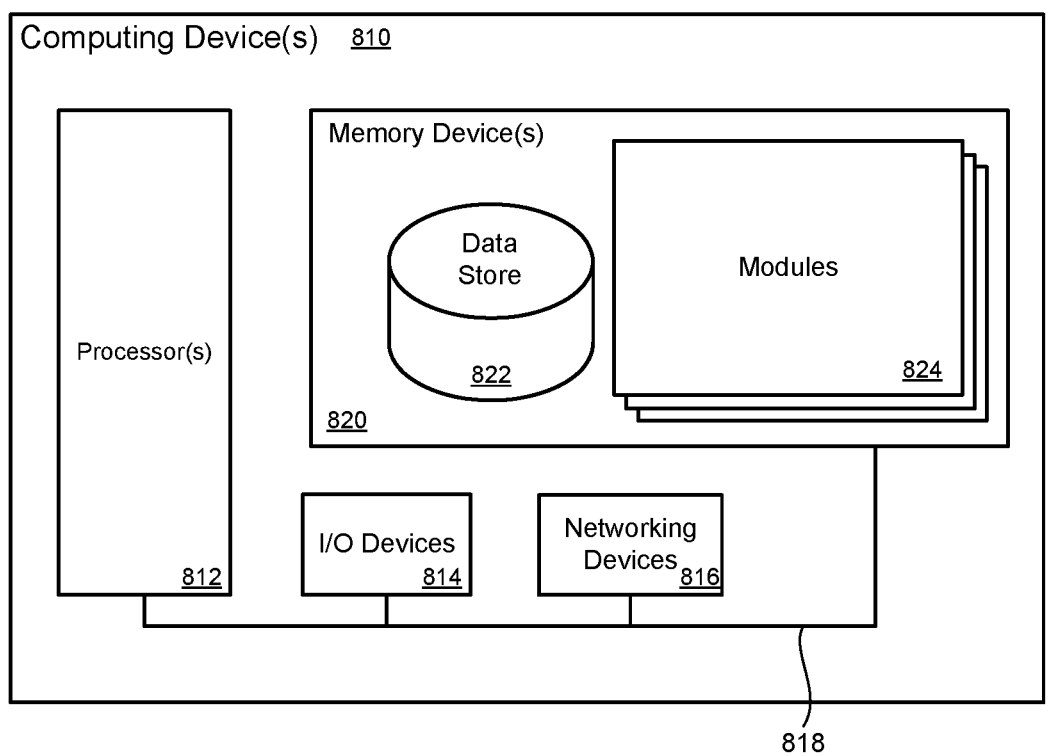
FIG. 8 is block diagram illustrating an example of a computing device that may be used to execute a method for monitoring interaction events at services and determining service management actions based in part on the interaction events.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 that are executable by the processor(s) 812 and data for the modules 824. In one example, the memory device 820 may contain a metadata collection module, an interaction map module, an interaction map analysis module, and a management action module. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory device 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system comprising:
   at least one processor;

a memory device including instructions that, when executed by the at least one processor, cause the system to:

obtain metadata describing application programming interface (API) requests received at services executing in a computing service environment, wherein the metadata is generated at a gateway or a service in response to receiving an API request;

generate, using the metadata, a routing map describing routing paths for the API requests;

analyze the routing map to identify API routing characteristics associated with routing the API requests to the services; and determine an API request management action based in part on the API routing characteristics identified in the routing map.

2. The system as in claim 1, wherein the memory device further includes instructions that, when executed by the at least one processor, cause the system to:

identify an API request routing scheme that shifts a processing load of a service to other services, wherein the API routing characteristics indicate the processing load of the service based in part on a volume of API request events that occur at the service; and initiate the API request management action that implements the API request routing scheme.

3. The system as in claim 1, wherein the memory device further includes instructions that, when executed by the at least one processor, cause the system to:

identify API request patterns indicated by the API routing characteristics;

predict API request events at the services using the API request patterns; and initiate performance of the API request management action based in part on a predicted API request event.

4. The system as in claim 1, wherein the memory device further includes instructions that, when executed by the at least one processor, cause the system to:

identify abnormal API routing characteristics that suggest an impending system failure; and initiate the API request management action based in part on the impending system failure.

5. The system as in claim 1, wherein the memory device further includes instructions that, when executed by the at least one processor, cause the system to:

identify a topology weakness in a service request topology available to the services as indicated by the API routing characteristics; and initiate the API request management action to mitigate the weakness in the service request topology.

6. The system as in claim 1, wherein the memory device further includes instructions that, when executed by the at least one processor, cause the system to:

identify a routing path that has a decreased routing time as compared to routing times of other routing paths as indicated by the API routing characteristics; and initiate the API request management action that instructs a service to use the routing path.

7. The system as in claim 1, wherein the memory device further includes instructions that, when executed by the at least one processor, cause the system to:

identify an imbalance in distribution of API requests to instances of a service which comprises multiple service instances as indicated by the API routing characteristics;

determine weightings for distributing the API requests to the instances of the service in order to mitigate the imbalance in distributing the API requests to the instances of the service; and assign the weightings to the instances of the service, wherein the API requests are distributed to the instances of the service according to the weightings.

8. The system as in claim 1, wherein the services executing in the computing service environment are autonomous services that are interconnected via a computer network accessible by way of a service API gateway.

9. The system as in claim 1, wherein the services executing in the computing service environment are narrowly focused independently deployable micro-services.

10. A computer implemented method, comprising:

receiving, at an application programming interface (API) event monitor, metadata describing API request events associated with a group of dependent services executing in a computing service environment, wherein the metadata is generated at a service included in the group of dependent services in response to an API request event;

generating, using the metadata, a routing map describing routing paths for the API request events associated with services in the group of dependent services;

analyzing the routing map to identify API routing characteristics associated with routing API requests to the services included in the group of dependent services; and initiating an API request management action based in part on the API routing characteristics identified in the routing map.

11. The method as in claim 10, wherein initiating the API request management action further comprises:

analyzing the API routing characteristics of a current routing path in the routing map used by a service;

identifying an alternate routing path available to the service;

comparing the API routing characteristics of the current routing path and routing characteristics of the alternate routing path;

determining that the alternate routing path results in more efficient processing of an API request as compared to the current routing path; and instructing the service to utilize the alternate routing path.

12. The method as in claim 10, initiating the API request management action further comprises further comprises:

identifying an API request pattern associated with a service, as indicated by the API routing characteristics;

predicting an API request event at the service based in part on the API request pattern; and initiating the API request management action in anticipation of the predicted API request event.

13. The method as in claim 10, wherein initiating the API request management action further comprises:

identifying a processing load of a service based in part on a volume of interaction events that occur at the service as indicated by the API routing characteristics; and initiating the API request management action to shift at least a portion of the processing load to other services.

14. The method as in claim 10, further comprising appending a control instruction to an API request that instructs a service to perform the API request management action.

15. The method as in claim 10, wherein an API gateway is configured to generate the metadata in response to the API request events.

16. The method as in claim 10, wherein the metadata describing the API requests includes at least one of: a request identifier, outbound request identifier, a composite identifier, timing, status, or return value.

17. A non-transitory machine readable storage medium having instructions embodied thereon, the instructions when executed by at least one processor:
- obtain metadata that describes application programming interface (API) requests received at API gateways for micro-services executing in a computing service environment that are interconnected via a computer network and the API gateways, wherein the API gateways generate the metadata and send the metadata to a data store;
- generate, using the metadata, a routing map detailing routing paths for the API requests received at the API gateways for the micro-services;
- analyze the routing map to identify API routing characteristics associated with routing the API requests to the micro-services; and
- determine an API request management action based in part on the API routing characteristics identified in the routing map.

18. The non-transitory machine readable storage medium as in claim 17, wherein the instructions that when executed by the at least one processor further initiate the API request management action to shift at least a portion of a processing load of a service to other services.

19. The non-transitory machine readable storage medium as in claim 17, wherein the instructions that when executed by the at least one processor further:
- identify abnormal API routing characteristics that suggest a malicious network activity as indicated by the API routing characteristics; and
- block API requests received from an identified API request source associated with the abnormal API routing characteristics.

20. The non-transitory machine readable storage medium as in claim 17, wherein the instructions that when executed by the at least one processor further:
- identify a routing path that has a decreased routing time among the micro-services as compared to routing times of other routing paths as indicated by the API routing characteristics; and
- initiate the API request management action that instructs a micro-service to use the routing path.

* * * * *